(12) United States Patent
Tanaka et al.

(10) Patent No.: US 10,874,908 B2
(45) Date of Patent: *Dec. 29, 2020

(54) GOLF BALL

(71) Applicant: SUMITOMO RUBBER INDUSTRIES, LTD., Kobe (JP)

(72) Inventors: Mami Tanaka, Kobe (JP); Toshiyuki Tarao, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 25 days.

This patent is subject to a terminal disclaimer.

(21) Appl. No.: 16/432,642

(22) Filed: Jun. 5, 2019

(65) Prior Publication Data

US 2020/0009426 A1   Jan. 9, 2020

(30) Foreign Application Priority Data

Jul. 4, 2018   (JP) ................................. 2018-127424

(51) Int. Cl.
| | |
|---|---|
| *A63B 37/06* | (2006.01) |
| *A63B 37/00* | (2006.01) |
| *C08J 7/04* | (2020.01) |
| *C09D 187/00* | (2006.01) |

(52) U.S. Cl.
CPC ...... *A63B 37/0022* (2013.01); *A63B 37/0033* (2013.01); *C08J 7/042* (2013.01); *C09D 187/00* (2013.01); *A63B 37/008* (2013.01); *A63B 37/0024* (2013.01); *A63B 37/0031* (2013.01); *A63B 37/0043* (2013.01); *A63B 37/0045* (2013.01); *A63B 37/0053* (2013.01); *A63B 37/0064* (2013.01); *A63B 37/0073* (2013.01); *A63B 37/0074* (2013.01); *A63B 37/0076* (2013.01); *A63B 37/0087* (2013.01); *A63B 37/0096* (2013.01); *C08J 2309/00* (2013.01); *C08J 2487/00* (2013.01)

(58) Field of Classification Search
CPC ................................................. A63B 37/0022
USPC ........................................................... 473/378
See application file for complete search history.

(56) References Cited

U.S. PATENT DOCUMENTS

| | | | |
|---|---|---|---|
| 2016/0136484 A1 | 5/2016 | Inoue et al. | |
| 2017/0056731 A1 | 3/2017 | Tarao et al. | |
| 2017/0173398 A1 | 6/2017 | Tachibana et al. | |
| 2018/0178071 A1* | 6/2018 | Kamino | ............ C08G 18/4854 |

FOREIGN PATENT DOCUMENTS

| | | |
|---|---|---|
| JP | 2016-93386 A | 5/2016 |
| JP | 2017-42280 A | 3/2017 |

* cited by examiner

*Primary Examiner* — Raeann Gorden
(74) *Attorney, Agent, or Firm* — Birch, Stewart, Kolasch & Birch LLP (57) ABSTRACT

A golf ball includes a main body and a paint layer positioned outside the main body. The paint layer includes an inner layer and an outer layer positioned outside the inner layer. When an indentation depth (nm) is measured on a cross-section along a plane passing through a central point of the golf ball when a force of 30 mgf is applied to the cross-section in a direction perpendicular to the cross-section, an indentation depth Di on a cross-section of the inner layer is smaller than an indentation depth Do on a cross-section of the outer layer. A thickness To of the outer layer is larger than a thickness Ti of the inner layer.

9 Claims, 1 Drawing Sheet

GOLF BALL

This application claims priority on Patent Application No. 2018-127424 filed in JAPAN on Jul. 4, 2018. The entire contents of this Japanese Patent Application are hereby incorporated by reference.

BACKGROUND OF THE INVENTION

Field of the Invention

The present invention relates to golf balls. Specifically, the present invention relates to golf balls having a paint layer.

Description of the Related Art

Golf players place importance on spin performance of golf balls. When the rate of backspin is high, the run is short. By using a golf ball having a high backspin rate, a golf player can cause the golf ball to stop at a target point. When the rate of sidespin is high, the golf ball tends to curve. By using a golf ball having a high sidespin rate, a golf player can intentionally cause the golf ball to curve. A golf ball having excellent spin performance has excellent controllability. In particular, golf balls having excellent controllability not only upon an approach shot but also upon a shot with a middle iron are desired.

Most golf balls have a paint layer on the surface thereof. In JP2016-093386, modifications for enhancing controllability upon an approach shot are made by forming a paint layer from a predetermined curing type paint composition.

In addition, in play, a golf ball is hit under various conditions. In JP2017-042280, a golf ball having a paint layer that includes two layers having different 10% moduli is proposed for increasing a spin rate upon an approach shot under a dry condition and under a wet condition.

A golf ball is hit with various clubs in accordance with the situation of play. Use of a flexible paint layer improves, for example, a spin rate upon a shot with a wedge. However, according to the finding by the present inventors, the spin rate obtained upon a shot, with a middle iron or the like, of a golf ball in which a flexible paint layer is used is not sufficiently high.

Golf players also place importance on feel at impact of a golf ball as well as controllability. Normally, soft feel at impact is preferred, but, in the case of hitting with a wedge or the like, appropriate response may be desired. The feel at impact upon an approach shot needs to be further improved.

An object of the present invention is to provide a golf ball having excellent controllability upon a shot with a middle iron and excellent feel at impact upon an approach shot.

SUMMARY OF THE INVENTION

A golf ball according to the present invention includes a main body and a paint layer positioned outside the main body. The paint layer includes an inner layer and an outer layer positioned outside the inner layer. When an indentation depth (nm) is measured on a cross-section along a plane passing through a central point of the golf ball when a force of 30 mgf is applied to the cross-section in a direction perpendicular to the cross-section, an indentation depth Di on a cross-section of the inner layer is smaller than an indentation depth Do on a cross-section of the outer layer. A thickness To of the outer layer is larger than a thickness Ti of the inner layer.

In the golf ball according to the present invention, the paint layer has a relatively thick and flexible outer layer and a relatively thin and hard inner layer. The thick and flexible outer layer achieves a high spin rate upon a shot with an iron. The thin and hard inner layer does not impair the effect achieved by the outer layer. Furthermore, when this golf ball is hit with a wedge or the like, the paint layer having the thick and flexible outer layer and the thin and hard inner layer can provide appropriate feel at impact to the golf player. The golf ball has excellent controllability upon a shot with a middle iron and excellent feel at impact upon an approach shot.

The indentation depth Do is preferably not less than 1000 nm and not greater than 3500 nm. The indentation depth Di is preferably not less than 100 nm and less than 1000 nm.

The thickness To is preferably not less than 8 μm and not greater than 20 μm. The thickness Ti is preferably not less than 1 μm and not greater than 10 μm.

A difference (To−Ti) between the thickness To and the thickness Ti is preferably not less than 3 μm and not greater than 17 μm.

A difference (Do−Di) between the indentation depth Do and the indentation depth Di is preferably not less than 1000 nm and not greater than 3100 nm.

The outer layer is preferably formed from a paint composition including: a base material including a polyrotaxane; and a curing agent including a polyisocyanate compound. The polyrotaxane has cyclodextrins, a linear molecule threaded through ring structures of the cyclodextrins, and a blocking group which is located at each of both ends of the linear molecule and prevents detachment of the cyclodextrins. At least a part of hydroxyl groups of each cyclodextrin is modified with a caprolactone chain via an —O—$C_3H_6$— O— group.

A mole ratio (NCO/OH) of an isocyanate group (NCO group) of the curing agent including the polyisocyanate compound to a hydroxyl group (OH group) of the base material including the polyrotaxane is preferably not less than 1.0 and not greater than 2.0.

DESCRIPTION OF THE PREFERRED EMBODIMENTS

The following will describe in detail the present invention based on preferred embodiments with appropriate reference to the drawings.

Figure 1:
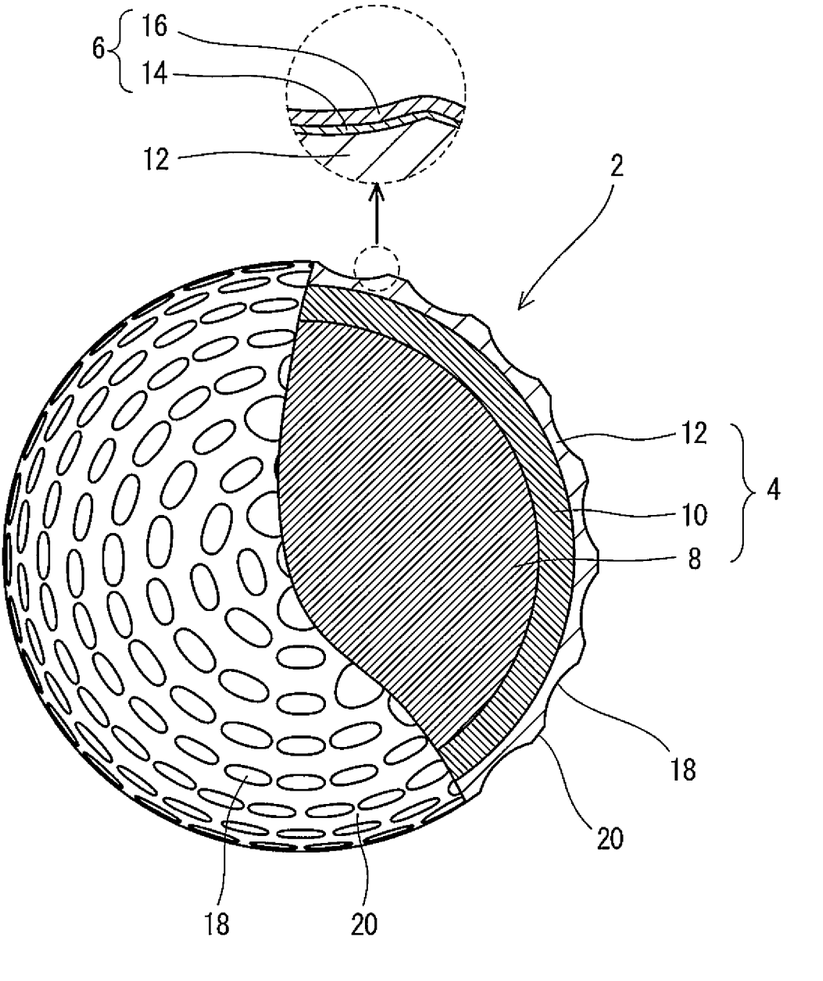
FIG. 1 is a partially cutaway cross-sectional view of a golf ball according to one embodiment of the present invention.

A golf ball 2 shown in FIG. 1 includes a main body 4 and a paint layer 6 positioned outside the main body 4. The main body 4 includes a spherical core 8, a mid layer 10 positioned outside the core 8, and a cover 12 positioned outside the mid layer 10. The paint layer 6 includes an inner layer 14 positioned outside the cover 12, and an outer layer 16 positioned outside the inner layer 14. The golf ball 2 has a plurality of dimples 18 on the surface thereof. Of the surface of the golf ball 2, a part other than the dimples 18 is a land 20. The golf ball 2 may include a mark layer. The mark layer may be positioned between the cover 12 and the paint layer 6, or may be positioned outside the paint layer 6. The mark layer may be positioned between the inner layer 14 and the outer layer 16.

The paint layer 6 may further include another layer between the inner layer 14 and the outer layer 16. In the specification of the present application, among a plurality of layers forming the paint layer 6, the layer that is closest to the cover 12 is defined as the inner layer 14, and the layer that is furthest from the cover 12 is defined as the outer layer 16.

In the present invention, the indentation depth of the inner layer 14 of the paint layer 6 and the indentation depth of the outer layer 16 are measured.

In measurement of the indentation depth, the golf ball 2 is divided to obtain a hemisphere. On the hemisphere, a cross-section passing through the central point of the golf ball 2 is exposed. The cross-section includes a cross-section of the paint layer 6. The cross-section of the paint layer 6 includes a cross-section of the inner layer 14 and a cross-section of the outer layer 16. The cross-section of the hemisphere is made horizontal by a cryo-microtome. A penetrator of a nanoindenter is brought into contact with this cross-section and pressed against the cross-section in a direction perpendicular to the cross-section. Due to this pressing, the penetrator advances. A load and an advancing distance of the penetrator are measured. The conditions at the measurement are as follows.

Nanoindenter: "ENT-2100" manufactured by ELIONIX INC.
Temperature: 30° C.
Penetrator: Berkovich penetrator (65.03° As(h)=26.43 h$^2$)
Number of partitions: 500 steps
Step interval: 20 msec (100 mgf)

The load of the penetrator is gradually increased until reaching 50 mgf. When the load is 30 mgf, the advancing distance (nm) of the penetrator is measured as an indentation depth.

An advancing distance of the penetrator measured on the cross-section of the inner layer 14 in the cross-section along a plane passing through the central point of the golf ball 2 is an indentation depth Di of the inner layer 14. An advancing distance of the penetrator measured on the cross-section of the outer layer 16 is an indentation depth Do of the outer layer 16. The hardness of the inner layer 14 is accurately evaluated on the basis of the indentation depth Di. The hardness of the outer layer 16 is accurately evaluated on the basis of the indentation depth Do.

In the present invention, the indentation depth Di of the inner layer 14 is less than the indentation depth Do of the outer layer 16. In other words, the outer layer 16 is more flexible than the inner layer 14. Furthermore, a thickness To of the outer layer 16 is larger than a thickness Ti of the inner layer 14. When the golf ball 2 that includes the thick and flexible outer layer 16 is hit with a middle iron or the like, a high spin rate is achieved. Meanwhile, the inner layer 14 is thinner and harder than the outer layer 16. The thin and hard inner layer 14 does not impair the spin improvement effect achieved by the outer layer 16. Furthermore, since the golf ball 2 includes the thick and flexible outer layer 16 and the thin and hard inner layer 14, the golf ball 2 provides appropriate feel at impact to a golf player upon a shot with a wedge. The golf ball 2 has excellent controllability upon a shot with a middle iron and excellent feel at impact upon an approach shot.

In light of achievement of both desired controllability and desired feel at impact, the indentation depth Do of the outer layer 16 is preferably not less than 1000 nm, more preferably not less than 1100 nm, and particularly preferably not less than 1200 nm. In particular, in light of improvement of a spin rate upon a shot with a middle iron, the indentation depth Do of the outer layer 16 is preferably not greater than 3500 nm, more preferably not greater than 3400 nm, and particularly preferably not greater than 3300 nm.

In light of achievement of both desired controllability and desired feel at impact, the indentation depth Di of the inner layer 14 is preferably not less than 100 nm, more preferably not less than 200 nm, and particularly preferably not less than 300 nm. From the same viewpoint, the indentation depth Di of the inner layer 14 is preferably less than 1000 nm, more preferably not greater than 900 nm, and particularly preferably not greater than 800 nm.

In light of achievement of both desired controllability and desired feel at impact, the difference (Do−Di) between the indentation depth Do of the outer layer 16 and the indentation depth Di of the inner layer 14 is preferably not less than 1000 nm, more preferably not less than 1200 nm, further preferably not less than 1400 nm, particularly preferably not less than 1900 nm. The difference (Do−Di) is preferably not greater than 3100 nm, more preferably not greater than 2800 nm, and further preferably not greater than 2600 nm.

In light of achievement of both desired controllability and desired feel at impact, the thickness To of the outer layer 16 is preferably not less than 8 μm, more preferably not less than 9 μm, further preferably not less than 10 μm, and particularly preferably not less than 11 μm. In particular, in light of improvement of a spin rate upon a shot with a middle iron, the thickness To is preferably not greater than 20 μm, more preferably not greater than 18 μm, and particularly preferably not greater than 16 μm.

In light of achievement of both desired controllability and desired feel at impact, the thickness Ti of the inner layer 14 is preferably not greater than 10 μm, more preferably not greater than 8 μm, and particularly preferably not greater than 6 μm. From the same viewpoint, the thickness Ti is preferably not less than 1 μm, more preferably not less than 2 μm, and particularly preferably not less than 3 μm.

In light of achievement of both desired controllability and desired feel at impact, the difference (To−Ti) between the thickness To of the outer layer 16 and the thickness Ti of the inner layer 14 is preferably not less than 3 μm, more preferably not less than 4 μm, and particularly preferably not less than 5 μm. The difference (To−Ti) is preferably not greater than 17 μm, more preferably not greater than 16 μm, and particularly preferably not greater than 15 μm.

In light of being able to influence a spin rate upon a shot with a middle iron, the sum (Ti+To) of the thickness Ti of the inner layer 14 and the thickness To of the outer layer 16 is preferably not less than 10 μm and more preferably not less than 12 μm. The upper limit of the sum (Ti+To) is not particularly limited, but the sum (Ti+To) is preferably not greater than 50 μm.

The inner layer 14 is formed from a resin composition. Examples of the base resin of the resin composition include urethane resins, epoxy resins, acrylic resins, vinyl acetate resins, and polyester resins. Particularly preferable base resins are urethane resins.

The outer layer 16 is formed from a resin composition. Examples of the base resin of the resin composition include urethane resins, epoxy resins, acrylic resins, vinyl acetate resins, and polyester resins. Particularly preferable base resins are urethane resins.

Typically, each of the inner layer 14 and the outer layer 16 is formed from a polyurethane paint. The paint layer 6 including the inner layer 14 and the outer layer 16 that are formed from different types of polyurethane paints is preferable.

The polyurethane paint is a paint composition including a base material and a curing agent. The base material of the paint composition is a polyol composition (A), and the curing agent of the paint composition is a polyisocyanate composition (B).

The polyol composition (A) contains a polyol compound. The polyol compound has two or more hydroxyl groups within the molecule thereof. The polyol compound may be a polyol compound (a1) having a hydroxyl group at an end of the molecular chain thereof, or may be a polyol compound (a2) having a hydroxyl group at a portion of the molecular chain other than the ends thereof. The polyol composition (A) may contain two or more polyol compounds.

The polyol compound (a1) having a hydroxyl group at an end of the molecular chain thereof includes a low-molecular-weight polyol and a high-molecular-weight polyol. The low-molecular-weight polyol has a number average molecular weight of less than 500. The high-molecular-weight polyol has a number average molecular weight of not less than 500.

Examples of the low-molecular-weight polyol include: diols such as ethylene glycol, diethylene glycol, triethylene glycol, 1,3-butanediol, 1,4-butanediol, neopentyl glycol, and 1,6-hexanediol; and triols such as glycerin, trimethylol propane, and hexanetriol.

Examples of the high-molecular-weight polyol include: polyether polyols, polyester polyols, polycaprolactone polyols, polycarbonate polyols, urethane polyols, and acrylic polyols. Examples of polyether polyols include polyoxyethylene glycol (PEG), polyoxypropylene glycol (PPG), and polyoxytetramethylene glycol (PTMG). Examples of polyester polyols include polyethylene adipate diol, polybutylene adipate diol, and polyhexamethylene adipate diol. Examples of polycaprolactone polyols include poly-ε-caprolactone diol. Examples of polycarbonate polyols include polyhexamethylene carbonate diol.

The urethane polyol has two or more urethane bonds and two or more hydroxyl groups within the molecule. The urethane polyol can be obtained by causing a reaction of a polyol component and a polyisocyanate component under a condition that the hydroxyl groups of the polyol component are excessive with respect to the isocyanate groups of the polyisocyanate component.

Examples of the polyol component, which is a starting material of the urethane polyol, include polyether diols, polyester diols, polycaprolactone diols, and polycarbonate diols. A preferable polyol component is a polyether diol such as polyoxyethylene glycol, polyoxypropylene glycol, polyoxytetramethylene glycol, or the like. Polyoxytetramethylene glycol is more preferable.

The polyether diol preferably has a number average molecular weight of not less than 550. The polyether diol having a number average molecular weight of not less than 550 can contribute to spin rate improvement. From this viewpoint, the molecular weight is more preferably not less than 600 and particularly preferably not less than 630. The molecular weight is preferably not greater than 3,000. The polyether diol having a molecular weight of not greater than 3,000 can contribute to feel at impact of the paint layer 6. From this viewpoint, the molecular weight is more preferably not greater than 2,500 and particularly preferably not greater than 2,000. The number average molecular weight of the polyol component is measured by gel permeation chromatography (GPC). The measurement conditions are as follows.

Reference material: polystyrene
Eluant: tetrahydrofuran
Column: organic solvent GPC column ("Shodex KF Series" manufactured by Showa Denko K.K.)

A urethane polyol including 60% by weight or greater of a polyether diol is preferable. The urethane polyol can contribute to spin rate improvement. From this viewpoint, the content of the polyether diol in the urethane polyol is more preferably not less than 62% by weight and particularly preferably not less than 65% by weight.

A low-molecular-weight polyol can be used as the polyol component, which is the starting material of the urethane polyol. Examples of the low-molecular-weight polyol include: diols such as ethylene glycol, diethylene glycol, triethylene glycol, 1,3-butanediol, 1,4-butanediol, neopentyl glycol, and 1,6-hexanediol; and triols such as glycerin, trimethylol propane, and hexanetriol. Two or more low-molecular-weight polyols may be used as the starting material.

The polyisocyanate component, which is a starting material of the urethane polyol, has two or more isocyanate groups. Examples of the polyisocyanate component include: aromatic polyisocyanates such as 2,4-toluene diisocyanate, 2,6-toluene diisocyanate, a mixture (TDI) of 2,4-toluene diisocyanate and 2,6-toluene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and paraphenylene diisocyanate (PPDI); alicyclic polyisocyanates such as 4,4'-dicyclohexylmethane diisocyanate ($H_{12}$MDI), hydrogenated xylylene diisocyanate ($H_6$XDI), hexamethylene diisocyanate (HDI), isophorone diisocyanate (IPDI), and norbornene diisocyanate (NBDI); and aliphatic diisocyanates. As the starting material, two or more polyisocyanates may be used.

The urethane polyol preferably has a weight average molecular weight of not less than 4,000. The urethane polyol having a weight average molecular weight of not less than 4,000 can contribute to spin rate improvement. From this viewpoint, the molecular weight is more preferably not less than 4,300 and particularly preferably not less than 4,500. The molecular weight is preferably not greater than 20,000. The urethane polyol having a molecular weight of not greater than 20,000 can contribute to feel at impact of the paint layer 6. From this viewpoint, the molecular weight is more preferably not greater than 18,000 and particularly preferably not greater than 16,000.

The urethane polyol has a hydroxyl value of preferably not less than 10 mg KOH/g, more preferably not less than 15 mg KOH/g, and particularly preferably not less than 20 mg KOH/g. The hydroxyl value is preferably not greater than 200 mg KOH/g, more preferably not greater than 190 mg KOH/g, and particularly preferably not greater than 180 mg KOH/g. The hydroxyl value is measured according to the standards of "JIS K 1557-1". For the measurement, the acetylation method is adopted.

Examples of the polyol compound (a2) having a hydroxyl group at the portion of the molecule other than the ends thereof include a modified polyrotaxane having a hydroxyl group, and a hydroxyl group-modified vinyl chloride-vinyl acetate copolymer.

The modified polyrotaxane having a hydroxyl group (hereinafter, referred to as "polyrotaxane") has cyclodextrins, a linear molecule, and a blocking group. The cyclodextrins are ring molecules. The linear molecule is threaded through the ring structures of the cyclodextrins. The blocking group is located at each of both ends of the linear molecule. The blocking group prevents detachment of the cyclodextrins from the linear molecule. In the polyrotaxane, the cyclodextrins are movable along the linear molecule. When tension is applied to the paint layer 6 including the polyrotaxane, the tension is distributed. The paint layer 6 is flexible and has excellent durability.

The cyclodextrins are oligosaccharides having a ring structure. In the cyclodextrins, 6 to 8 D-glucopyranose units are linked to each other by α-1,4-glucoside linkage to form a ring. Examples of the cyclodextrins include α-cyclodextrin (the number of glucoses: 6), β-cyclodextrin (the number of glucoses: 7), and γ-cyclodextrin (the number of glucoses: 8). α-cyclodextrin is preferable. Two or more types of cyclodextrins may be used in combination.

Examples of the linear molecule threaded through the cyclodextrins include polyalkylenes, polyesters, polyethers, and polyacrylics. Polyethers are preferable, and polyethylene glycol is particularly preferable.

The weight average molecular weight of the linear molecule is preferably not less than 5,000 and particularly preferably not less than 6,000. The molecular weight is preferably not greater than 100,000 and particularly preferably not greater than 80,000.

A linear molecule having functional groups at both ends thereof is preferable. The linear molecule can easily react with the blocking group. Examples of the functional groups include hydroxyl group, carboxy group, amino group, and thiol group.

Examples of a method for preventing detachment of the cyclodextrins by the blocking group include a physical prevention method with a bulky blocking group, and an electrostatic prevention method with an ionic blocking group. Examples of the bulky blocking group include cyclodextrins and adamantane group. The ratio of the number of the cyclodextrins through which the linear molecule is threaded, relative to the maximum number of the cyclodextrins, is preferably not less than 0.06 and not greater than 0.61, more preferably not less than 0.11 and not greater than 0.48, and particularly preferably not less than 0.24 and not greater than 0.41. The paint layer 6 in which the ratio falls within the above range has excellent physical properties.

A polyrotaxane in which at least a part of the hydroxyl groups included in each cyclodextrin is modified with a caprolactone chain is preferable. With the polyrotaxane, steric hindrance between the polyrotaxane and a polyisocyanate compound which is a curing agent is alleviated.

Hereinafter, one example of a method for the modification will be described. First, the hydroxyl groups of each cyclodextrin are treated with propylene oxide to be hydroxypropylated. Next, εc-caprolactone is added to cause ring-opening polymerization. Accordingly, a caprolactone chain —(CO(CH$_2$)$_5$O)nH is bonded to the outside of the ring structure of the cyclodextrin via an —O—C$_3$H$_6$—O— group. The "n" represents a degree of polymerization, and is preferably a natural number of 1 to 100, more preferably a natural number of 2 to 70, and particularly preferably a natural number of 3 to 40. By the ring-opening polymerization, a hydroxyl group is formed at the other end of the caprolactone chain. The hydroxyl group can react with the polyisocyanate compound.

The proportion of the hydroxyl groups modified with a caprolactone chain to all the hydroxyl groups (100 mol %) included in the cyclodextrin that has not been modified is preferably not less than 2 mol %, more preferably not less than 5 mol %, and further preferably not less than 10 mol %. The polyrotaxane in which the proportion falls within the above range is hydrophobic. The reactivity of the polyrotaxane with the polyisocyanate compound is high.

The polyrotaxane preferably has a hydroxyl value of not less than 10 mg KOH/g and not greater than 400 mg KOH/g. The reactivity of the polyrotaxane with the polyisocyanate compound is high. From this viewpoint, the hydroxyl value is more preferably not less than 15 mg KOH/g and particularly preferably not less than 20 mg KOH/g. The hydroxyl value is more preferably not greater than 300 mg KOH/g and particularly preferably not greater than 220 mg KOH/g.

The polyrotaxane preferably has a weight average molecular weight of not less than 30,000 and not greater than 3,000,000. The polyrotaxane having a molecular weight of not less than 30,000 can contribute to the strength of the paint layer 6. From this viewpoint, the molecular weight is more preferably not less than 40,000 and particularly preferably not less than 50,000. The polyrotaxane having a molecular weight of not greater than 3,000,000 can contribute to the flexibility of the paint layer 6. From this viewpoint, the molecular weight is more preferably not greater than 2,500,000 and particularly preferably not greater than 2,000,000. The weight average molecular weight of the polyrotaxane is measured by the same method as that for the number average molecular weight of the polyether diol.

Specific examples of the polyrotaxane modified with polycaprolactone include trade names "SeRM Super Polymer SH3400P", "SeRM Super Polymer SH2400P", and "SeRM Super Polymer SH1310P", manufactured by Advanced Softmaterials Inc.

The hydroxyl group-modified vinyl chloride-vinyl acetate copolymer which is one example of the polyol compound (a2) having a hydroxyl group at the portion of the molecular chain other than the ends thereof can contribute to improvement of the spin rate of the golf ball 2. The copolymer can be obtained by copolymerization of a monomer having a hydroxyl group, vinyl chloride, and vinyl acetate. Examples of the monomer having a hydroxyl group include polyvinyl alcohol and hydroxyalkyl acrylate. The copolymer can also be obtained by partial saponification or full saponification of a vinyl chloride-vinyl acetate copolymer.

The content of the vinyl chloride component in the hydroxyl group-modified vinyl chloride-vinyl acetate copolymer is preferably not less than 1% by weight, more preferably not less than 20% by weight, and particularly preferably not less than 50% by weight. The content is preferably not greater than 99% by weight and particularly preferably not greater than 95% by weight. Specific examples of the hydroxyl group-modified vinyl chloride-vinyl acetate copolymer include trade names "Solbin A", "Solbin AL", and "Solbin TA3", manufactured by Nissin Chemical Industry Co., Ltd.

As embodiments of a preferable polyol composition (A), the following is exemplified.

Embodiment 1: a composition including a urethane polyol containing a polyether diol having a number average molecular weight of not less than 550 and not greater than 3,000.

Embodiment 2: a composition including a polyrotaxane in which at least a part of the hydroxyl groups included in each cyclodextrin is modified with a caprolactone chain via an —O—C$_3$H$_6$—O— group.

The proportion of the urethane polyol to the entire polyol compound in the polyol composition (A) of Embodiment 1 is preferably not less than 60% by weight, more preferably not less than 70% by weight, and particularly preferably not less than 80% by weight. The polyol composition (A) may include only the urethane polyol as the polyol compound.

The proportion of the polyrotaxane to the entire polyol compound in the polyol composition (A) of Embodiment 2 is preferably not less than 10% by weight, more preferably not less than 15% by weight, and particularly preferably not less than 20% by weight. The proportion is preferably not greater than 100% by weight, more preferably not greater than 90% by weight, and particularly preferably not greater than 85% by weight.

The polyol composition (A) of Embodiment 2 preferably contains a polycaprolactone polyol. The weight ratio of the polycaprolactone polyol and the polyrotaxane is preferably not less than 0/100, more preferably not less than 5/95, and particularly preferably not less than 10/90. The ratio is preferably not greater than 90/10, more preferably not greater than 85/15, and particularly preferably not greater than 80/20.

The polyol composition (A) of Embodiment 2 preferably contains the aforementioned hydroxyl group-modified vinyl chloride-vinyl acetate copolymer. The proportion of the hydroxyl group-modified vinyl chloride-vinyl acetate copolymer to the entire polyol compound in the polyol composition (A) is preferably not less than 4% by weight and particularly preferably not less than 8% by weight. The proportion is preferably not greater than 50% by weight and particularly preferably not greater than 45% by weight.

The polyisocyanate composition (B) which is a curing agent contains a polyisocyanate compound. The polyisocyanate compound has two or more isocyanate groups.

Examples of the polyisocyanate compound include: aromatic diisocyanates such as 2,4-toluene diisocyanate, 2,6-toluene diisocyanate, a mixture (TDI) of 2,4-toluene diisocyanate and 2,6-toluene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and paraphenylene diisocyanate (PPDI); alicyclic or aliphatic diisocyanates such as 4,4'-dicyclohexylmethane diisocyanate ($H_{12}$MDI), hydrogenated xylylene diisocyanate ($H_6$XMI), hexamethylene diisocyanate (HDI), isophorone diisocyanate (IPDI), and norbornene diisocyanate (NBDI); and triisocyanates such as an allophanate product, a biuret product, an isocyanurate product, an adduct product of diisocyanates. The polyisocyanate composition (B) may include two or more polyisocyanate compounds.

Examples of preferable triisocyanates include an isocyanurate product of hexamethylene diisocyanate, a biuret product of hexamethylene diisocyanate, and an isocyanurate product of isophorone diisocyanate.

Preferably, the polyisocyanate composition (B) contains triisocyanates. The proportion of the triisocyanates to the entire polyisocyanate compound in the polyisocyanate composition (B) is preferably not less than 50% by weight, more preferably not less than 60% by weight, and particularly preferably not less than 70% by weight. The polyisocyanate composition (B) may contain only the triisocyanates as the polyisocyanate compound.

The isocyanate group amount (NCO %) of the polyisocyanate compound contained in the polyisocyanate composition (B) is preferably not less than 0.5% by weight, more preferably not less than 1.0% by weight, and particularly preferably not less than 2.0% by weight. The isocyanate group amount is preferably not greater than 45% by weight, more preferably not greater than 40% by weight, and particularly preferably not greater than 35% by weight. The isocyanate group amount (NCO %) is calculated by the following mathematical formula.

$$NCO=(100 \times Mi \times 42)/Wi$$

Mi: the number of moles of the isocyanate groups in the polyisocyanate compound

42: the molecular weight of NCO

Wi: the total weight (g) of the polyisocyanate compound

Specific examples of the polyisocyanate compound include: trade names "BURNOCK D-800", "BURNOCK DN-950", "BURNOCK DN-955", manufactured by DIC corporation; trade names "Desmodur N 75 MPA/X", "Desmodur N 3300", "Desmodur L 75 (C)", and "Sumidur E21-1", manufactured by Sumika Bayer Urethane CO., Ltd.; trade names "CORONATE HX" and "CORONATE HK", manufactured by Tosoh Corporation; trade names "DURANATE 24A-100", "DURANATE 21S-75E", "DURANATE TPA-100", and "DURANATE TKA-100", manufactured by Asahi Kasei Chemicals Corporation; and trade name "VESTANAT T1890" manufactured by Degussa AG.

Polyisocyanate compounds suitable for the polyol composition (A) of Embodiment 1 described above are a biuret-modified product of hexamethylene diisocyanate, an isocyanurate-modified product of hexamethylene diisocyanate, and an isocyanurate-modified product of isophorone diisocyanate. A biuret-modified product of hexamethylene diisocyanate and an isocyanurate-modified product of hexamethylene diisocyanate may be used in combination. In this case, the weight ratio of the biuret-modified product and the isocyanurate-modified product is preferably not less than 20/40 and not greater than 40/20, and particularly preferably not less than 25/35 and not greater than 35/25.

A polyisocyanate compound suitable for the polyol composition (A) of Embodiment 2 described above is an isocyanurate-modified product of hexamethylene diisocyanate.

In light of improvement of a spin rate upon a shot with a middle iron, the mole ratio (NCO/OH) of the isocyanate group (NCO group) of the polyisocyanate composition (B), which is the curing agent, to the hydroxyl group (OH group) of the polyol composition (A), which is the base material, is preferably not less than 0.10 and more preferably not less than 0.20. In light of feel at impact, the mole ratio (NCO/OH) is preferably not greater than 2.00, more preferably not greater than 1.80, and particularly preferably not greater than 1.60. The mixing ratio (A/B) between the base material and the curing agent on the solid content basis is adjusted as appropriate in accordance with the types of base material and curing agent to be used and a desired mole ratio (NCO/OH).

In the golf ball 2, the inner layer 14 is formed by applying a first paint composition to the outer surface of the cover 12 and drying the first paint composition. The drying temperature is preferably not lower than 30° C. and not higher than 70° C. The drying time is preferably not shorter than 1 hour and not longer than 24 hours.

In the golf ball 2, the outer layer 16 is formed by applying a second paint composition to the outer surface of the inner layer 14 and drying the second paint composition. The drying temperature is preferably not lower than 30° C. and not higher than 70° C. The drying time is preferably not shorter than 1 hour and not longer than 24 hours.

When the base material of the first paint composition includes a polyol compound having a low molecular weight and the base material of the second paint composition includes a polyol compound having a high molecular weight, the paint layer 6 in which the indentation depth Di is smaller than the indentation depth Do can be obtained.

In light of controllability, the outer layer 16 is preferably formed from a second paint composition including the polyol composition (A) of Embodiment 2 as a base material. In light of achievement of both desired controllability and desired feel at impact, preferably, the outer layer 16 is formed from a second paint composition including the polyol composition (A) of Embodiment 2 as a base material, and the inner layer 14 is formed from a first paint composition including the polyol composition (A) of Embodiment 1 as a base material.

In the case where the base materials of the first paint composition and the second paint composition are each the polyol composition (A) of Embodiment 1, the mole ratio (NCO/OH) in the first paint composition is preferably greater than the mole ratio (NCO/OH) in the second paint composition in light of controllability. In the case where the base material of the first paint composition is the polyol composition (A) of Embodiment 1 and the base material of the second paint composition is the polyol composition (A) of Embodiment 2, the mole ratio (NCO/OH) in the first paint composition is preferably equal to or less than the mole ratio (NCO/OH) in the second paint composition in light of controllability. In light of achievement of both desired controllability and desired feel at impact, the mole ratio (NCO/OH) in the first paint composition that includes the polyol composition (A) of Embodiment 1 as a base material is preferably not less than 0.5 and more preferably not less than 0.7. The mole ratio (NCO/OH) in this first paint composition is preferably not greater than 1.6 and more preferably not greater than 1.0. From the same viewpoint, the mole ratio (NCO/OH) in the second paint composition that includes the polyol composition (A) of Embodiment 2 as a base material is preferably not less than 1.0 and more preferably not less than 1.1. The mole ratio (NCO/OH) in this second paint composition is preferably not greater than 2.0 and more preferably not greater than 1.5.

In the case where the paint layer 6 further includes one or more layers in addition to the inner layer 14 and the outer layer 16, each layer is preferably formed from a polyurethane paint. In this case, the polyurethane paints for forming the respective layers may have the same composition or may have different compositions.

Hereinafter, a preferable configuration and materials of the main body 4 (the core 8, the mid layer 10, and the cover 12) in this embodiment will be sequentially described. However, the configuration and materials of the main body 4 can be changed within a range in which the object of the present invention is achieved. For example, the main body 4 may not include the mid layer 10. The main body 4 may have a single-layer structure. In addition, the main body 4 may further include a layer formed from another material, and may be formed with a multilayer structure having four or more layers.

The core 8 is formed by crosslinking a rubber composition. Examples of the base rubber of the rubber composition include polybutadienes, polyisoprenes, styrene-butadiene copolymers, ethylene-propylene-diene copolymers, and natural rubbers. Two or more rubbers may be used in combination. In light of resilience performance, polybutadienes are preferable, and high-cis polybutadienes are particularly preferable.

The rubber composition of the core 8 preferably includes a co-crosslinking agent. Examples of preferable co-crosslinking agents in light of resilience performance include zinc acrylate, magnesium acrylate, zinc methacrylate, and magnesium methacrylate. The rubber composition preferably includes an organic peroxide together with a co-crosslinking agent. Examples of preferable organic peroxides include dicumyl peroxide, 1,1-bis(t-butylperoxy)-3,3,5-trimethylcyclohexane, 2,5-dimethyl-2,5-di(t-butylperoxy)hexane, and di-t-butyl peroxide. An organic peroxide with particularly high versatility is dicumyl peroxide.

The rubber composition of the core 8 can include an organic sulfur compound. Examples of the organic sulfur compound include: naphthalenethiol compounds such as 1-naphthalenethiol, 2-naphthalenethiol, 4-chloro-1-naphthalenethiol, and the like; benzenethiol compounds such as benzenethiol, 4-chlorobenzenethiol, 3-bromobenzenethiol, 4-cyanobenzenethiol, and the like; and disulfide compounds such as diphenyl sulfide, bis(4-chlorophenyl)disulfide, bis(2,5-dichlorophenyl)disulfide, bis(2,4,6-trichlorophenyl) disulfide, bis(2,3,4,5,6-pentabromophenyl)disulfide (PBPS), and the like. 2-naphthalenethiol, diphenyl sulfide, and bis (2,3,4,5,6-pentabromophenyl)disulfide (PBPS) are preferable. Two or more organic sulfur compounds may be used in combination.

The rubber composition of the core 8 may include a carboxylic acid and/or a metal salt thereof in addition to the aforementioned co-crosslinking agent. A carboxylic acid including a carboxylic acid component having 1 to 30 carbon atoms and/or a metal salt thereof is preferable. Examples of preferable carboxylic acids include: saturated fatty acids such as octanoic acid, lauric acid, myristic acid, stearic acid, and the like; unsaturated fatty acids such as 10-undecylenic acid, myristoleic acid, palmitoleic acid, oleic acid, linolic acid, and the like; aromatic carboxylic acids such as benzoic acid, phthalic acid, salicylic acid, and the like; and the like. Examples of the metal component forming the carboxylic acid metal salt include magnesium, calcium, zinc, barium, and the like.

In light of flight performance, the amount of the carboxylic acid and/or the metal salt thereof per 100 parts by weight of the base rubber is preferably not less than 0.5 parts by weight and more preferably not less than 1.0 parts by weight. In light of spin performance, the amount of the carboxylic acid and/or the metal salt thereof per 100 parts by weight of the base rubber is preferably not greater than 30 parts by weight and more preferably not greater than 20 parts by weight. Two or more carboxylic acids and/or metal salts thereof may be used in combination.

The rubber composition of the core 8 may include a filler for specific gravity adjustment and the like. Examples of suitable fillers include zinc oxide, barium sulfate, calcium carbonate, and magnesium carbonate. The amount of the filler is determined as appropriate so that the intended specific gravity of the core 8 is accomplished. Furthermore, this rubber composition can include additives such as sulfur, an anti-aging agent, a coloring agent, a plasticizer, and a dispersant. The rubber composition may include synthetic resin powder or crosslinked rubber powder.

The core 8 has a weight of preferably not less than 10 g and not greater than 42 g. The temperature for crosslinking the core 8 is not lower that 140° C. and not higher than 180° C. The time for crosslinking the core 8 is not shorter than 10 minutes and not longer than 60 minutes.

In light of resilience performance, the core 8 has a diameter of preferably not less than 30.0 mm and particularly preferably not less than 38.0 mm. In light of spin performance, the diameter of the core 8 is preferably not greater than 42.0 mm and particularly preferably not greater than 41.5 mm. The core 8 may have a rib on the surface thereof. The core 8 may be hollow.

In light of spin performance, a Shore C hardness Ho at the central point of the core 8 is preferably not less than 40 and more preferably not less than 50. In light of feel at impact, the hardness Ho is preferably not greater than 75 and more preferably not greater than 65. In light of flight performance, a Shore C hardness Hs at the surface of the core 8 is preferably not less than 60 and more preferably not less than 70. In light of feel at impact, the hardness Hs is preferably not greater than 95 and more preferably not greater than 90.

In light of flight performance, the difference (Hs−Ho) between the hardness Hs and the hardness Ho is preferably not less than 10 and more preferably not less than 15. From the viewpoint of not excessively suppressing a spin rate, the difference (Hs−Ho) is preferably not greater than 40 and more preferably not greater than 35.

The hardness Ho is measured by pressing a Shore C type hardness scale mounted to an automated hardness meter (trade name "digi test II" manufactured by Heinrich Bareiss Prufgeratebau GmbH), against the central point of the cross-section of a hemisphere obtained by cutting the core 8. The hardness Hs is measured by pressing this hardness meter against the surface of the core 8. Both measurements are conducted in an environment of 23° C.

The mid layer 10 is formed from a resin composition. A preferable base polymer of the resin composition is an ionomer resin. Examples of preferable ionomer resins include binary copolymers formed with an α-olefin and an α,β-unsaturated carboxylic acid having 3 to 8 carbon atoms. Examples of other preferable ionomer resins include ternary copolymers formed with: an α-olefin; an α,β-unsaturated carboxylic acid having 3 to 8 carbon atoms; and an α,β-unsaturated carboxylate ester having 2 to 22 carbon atoms. For the binary copolymer and the ternary copolymer, preferable α-olefins are ethylene and propylene, while preferable α,β-unsaturated carboxylic acids are acrylic acid and methacrylic acid. In the binary copolymer and the ternary copolymer, some of the carboxyl groups are neutralized with metal ions. Examples of metal ions for use in neutralization include sodium ion, potassium ion, lithium ion, zinc ion, calcium ion, magnesium ion, aluminum ion, and neodymium ion.

Instead of an ionomer resin or together with an ionomer resin, the resin composition of the mid layer 10 may include another polymer. Examples of the other polymer include polystyrenes, polyamides, polyesters, polyolefins, and polyurethanes. The resin composition may include two or more polymers.

The resin composition of the mid layer 10 may include a coloring agent such as titanium dioxide, a filler such as barium sulfate, a dispersant, an antioxidant, an ultraviolet absorber, a light stabilizer, a fluorescent material, a fluorescent brightener, and the like. For the purpose of adjusting specific gravity, the resin composition may include powder of a metal with a high specific gravity such as tungsten, molybdenum, and the like.

In light of flight performance, the mid layer 10 has a Shore D hardness Hm of preferably not less than 40 and particularly preferably not less than 50. In light of controllability, the hardness Hm is preferably not greater than 90 and particularly preferably not greater than 80. In the case where the mid layer 10 includes two or more layers, the hardness of each layer forming the mid layer 10 preferably satisfies this numerical range. The method for measuring the hardness Hm will be described below.

The hardness Hm of the mid layer 10 is measured according to the standards of "ASTM-D 2240-68". The hardness Hm is measured with a Shore D type hardness scale mounted to an automated hardness meter (trade name "digi test II" manufactured by Heinrich Bareiss Prüfgerätebau GmbH). For the measurement, a sheet that is formed by hot press, that is formed from the same material as that of the mid layer 10, and that has a thickness of about 2 mm is used. Prior to the measurement, a sheet is kept at 23° C. for two weeks. At the measurement, three sheets are stacked.

In light of controllability, the mid layer 10 has a thickness Tm of preferably not less than 0.2 mm and particularly preferably not less than 0.5 mm. In light of feel at impact, the thickness Tm is preferably not greater than 2.5 mm and particularly preferably not greater than 2.2 mm. The thickness Tm of the mid layer 10 is measured at a position immediately below the land 20. In the case where the mid layer 10 includes two or more layers, the total thickness of all the layers forming the mid layer 10 preferably satisfies this numerical range.

The cover 12 is formed from a resin composition. A preferable base polymer of the resin composition is a thermoplastic polyurethane and/or a thermosetting polyurethane. A thermoplastic polyurethane is more preferable. The cover 12 formed from a resin composition including a thermoplastic polyurethane can contribute to the spin performance of the golf ball 2.

The thermoplastic polyurethane includes a polyurethane component as a hard segment, and a polyester component or a polyether component as a soft segment. The polyurethane component has, within the molecule, a urethane bond formed by reacting a polyol with a polyisocyanate.

The polyol for the polyurethane component has a plurality of hydroxyl groups. Low-molecular-weight polyols and high-molecular-weight polyols can be used.

Examples of an isocyanate for the polyurethane component include alicyclic diisocyanates, aromatic diisocyanates, and aliphatic diisocyanates. Alicyclic diisocyanates are particularly preferable. Since an alicyclic diisocyanate does not have any double bond in the main chain, the alicyclic diisocyanate suppresses yellowing of the cover 12. Examples of alicyclic diisocyanates include 4,4'-dicyclohexylmethane diisocyanate ($H_{12}MDI$), 1,3-bis(isocyanatomethyl)cyclohexane ($H_6XDI$), isophorone diisocyanate (IPDI), and trans-1,4-cyclohexane diisocyanate (CHDI). In light of versatility and processability, $H_{12}MDI$ is preferable.

Instead of a thermoplastic polyurethane or together with a thermoplastic polyurethane, the resin composition of the cover 12 may include another polymer. Examples of the other polymer include ionomer resins, polystyrenes, polyamides, polyesters, and polyolefins. The resin composition may include two or more polymers.

The resin composition of the cover 12 can include a coloring agent such as titanium dioxide, a filler such as barium sulfate, a dispersant, an antioxidant, an ultraviolet absorber, a light stabilizer, a fluorescent material, a fluorescent brightener, and the like.

In light of spin performance, the cover 12 has a Shore D hardness Hc of preferably not greater than 60 and more preferably not greater than 55. In light of flight performance, the hardness Hc is preferably not less than 20 and more preferably not less than 30. In the case where the cover 12 includes two or more layers, the hardness of each layer forming the cover 12 preferably satisfies this numerical range. The hardness Hc is measured by the same measurement method as that for the hardness Hm.

In light of spin performance, the cover 12 has a thickness Tc of preferably not less than 0.1 mm and more preferably not less than 0.2 mm. In light of flight performance, the thickness Tc is preferably not greater than 2.0 mm and more preferably not greater than 1.8 mm. The thickness Tc of the cover 12 is measured at a position immediately below the land 20. In the case where the cover 12 includes two or more layers, the total thickness of all the layers forming the cover 12 preferably satisfies this numerical range.

The golf ball 2 can include a reinforcing layer between the mid layer 10 and the cover 12. The reinforcing layer firmly adheres to the mid layer 10 and also to the cover 12. The reinforcing layer suppresses separation of the cover 12 from the mid layer 10. The reinforcing layer is formed from a polymer composition. Examples of the base polymer of the reinforcing layer include two-component curing type epoxy resins and two-component curing type urethane resins.

The golf ball 2 preferably has a diameter of not less than 40 mm and not greater than 45 mm. From the viewpoint of conformity to the rules established by the United States Golf Association (USGA), the diameter is particularly preferably not less than 42.67 mm. In light of suppression of air resistance, the diameter is more preferably not greater than 44 mm and particularly preferably not greater than 42.80 mm. The golf ball 2 preferably has a weight of not less than 40 g and not greater than 50 g. In light of attainment of great inertia, the weight is more preferably not less than 44 g and particularly preferably not less than 45.00 g. From the viewpoint of conformity to the rules established by the USGA, the weight is particularly preferably not greater than 45.93 g.

The golf ball 2 has an amount of compressive deformation Db of preferably not less than 1.80 mm, more preferably not less than 1.90 mm, and particularly preferably not less than 2.00 mm. In light of spin performance, the amount of compressive deformation Db is preferably not greater than 3.30 mm, more preferably not greater than 3.20 mm, and particularly preferably not greater than 3.10 mm.

For measurement of the amount of compressive deformation, a YAMADA type compression tester is used. In the tester, the golf ball 2 is placed on a hard plate made of metal. Next, a cylinder made of metal gradually descends toward the golf ball 2. The golf ball 2, squeezed between the bottom face of the cylinder and the hard plate, becomes deformed. A migration distance of the cylinder, starting from the state in which an initial load of 98 N is applied to the golf ball 2 up to the state in which a final load of 1274 N is applied thereto, is measured.

EXAMPLES

The following will show the effects of the present invention by means of Examples, but the present invention should not be construed in a limited manner on the basis of the description of these Examples.

[Preparation of Base Material]
[Polyol Composition No. 1 (Urethane Polyol)]

Polytetramethylene ether glycol (PTMG, number average molecular weight: 650) and trimethylol propane (TMP) were dissolved in a mixed solvent (toluene/methyl ethyl ketone, weight ratio: 15/85). The mole ratio (PTMG:TMP) was 1.8:1.0. Dibutyltin dilaurate was added to this solution as a catalyst in an amount of 0.1% by weight with respect to the entire base material. While this polyol solution was kept at 80° C., isophorone diisocyanate (IPDI) was dropped and mixed into the polyol solution. The mole ratio (NCO/OH) of this mixture solution was 0.6. After the dropping, the mixture solution was continuously agitated until the isocyanate component in the mixture solution was eliminated. Thereafter, the mixture solution was cooled at normal temperature to obtain, as a base material, a polyol composition No. 1 including a urethane polyol. The solid content of the polyol composition No. 1 was 30% by weight, the PTMG content thereof was 67% by weight, the hydroxyl value of the solid content thereof was 67.4 mg KOH/g, and the weight average molecular weight of the urethane polyol thereof was 4867.

[Polyol Composition No. 2 (Polyrotaxane)]

A polyol composition No. 2 was obtained as a base material by mixing 50 parts by weight of a polyrotaxane in which at least a part of the hydroxyl groups of each cyclodextrin is modified with a caprolactone chain via an —$C_3H_6$—O— group (trade name "SeRM Super Polymer SH3400P" manufactured by Advanced Softmaterials Inc., linear molecule: polyethylene glycol, blocking group: adamantane group, molecular weight of linear molecule: 35,000, hydroxyl value: 72 mg KOH/g, weight average molecular weight: 700,000), 28 parts by weight of a polycaprolactone polyol (trade name "Placcel 308" manufactured by Daicel Corporation, hydroxyl value: 190 to 200 mg KOH/g), 22 parts by weight of a vinyl chloride-vinyl acetate-vinyl alcohol copolymer (trade name "Solbin AL" manufactured by Nissin Chemical Industry Co., Ltd., hydroxyl value: 63.4 mg KOH/g), 0.1 parts by weight of a modified silicone (trade name "DBL-C31", manufactured by Gelest, Inc.), 0.01 parts by weight of dibutyltin dilaurate, and 100 parts by weight of a mixed solvent (xylene/methyl ethyl ketone, weight ratio: 70/30).

[Preparation of Curing Agent]
[Polyisocyanate Composition No. 1]

Mixed were 30 parts by weight of an isocyanurate-modified product of hexamethylene diisocyanate (trade name "DURANATE TKA-100", manufactured by Asahi Kasei Chemicals Corporation, NCO content: 21.7% by weight), 30 parts by weight of a biuret-modified product of hexamethylene diisocyanate (trade name "DURANATE 21S-75E", manufactured by Asahi Kasei Chemicals Corporation, NCO content: 15.5% by weight), and 40 parts by weight of an isocyanurate-modified product of isophorone diisocyanate (trade name "Desmodur Z 4470", manufactured by Sumika Bayer Urethane CO., Ltd., NCO content: 11.9% by weight). Methyl ethyl ketone, n-butyl acetate, and toluene were added as a solvent to this mixture to obtain a polyisocyanate composition No. 1 as a curing agent. The concentration of the polyisocyanate component in this composition was 60% by weight.

[Polyisocyanate Composition No. 2]

A polyisocyanate composition No. 2 was obtained as a curing agent by mixing 100 parts by weight of a biuret-modified product of hexamethylene diisocyanate (the aforementioned "DURANATE 21S-75E", NCO content: 15.5% by weight) and 100 parts by weight of methyl ethyl ketone.

[Polyisocyanate Composition No. 3]

A polyisocyanate composition No. 3 was obtained as a curing agent by mixing 100 parts by weight of an isocyanurate-modified product of toluene diisocyanate (trade name "Desmodur IL 1451", manufactured by Sumika Covestro Urethane Co., Ltd., NCO content: 7.4% by weight) and 100 parts by weight of methyl ethyl ketone.

[Polyisocyanate Composition No. 4]

Mixed were 50 parts by weight of an isocyanurate-modified product of hexamethylene diisocyanate (trade name "DURANATE TKA-100", manufactured by Asahi Kasei Chemicals Corporation, NCO content: 21.7% by weight) and 50 parts by weight of an isocyanurate-modified product of isophorone diisocyanate (trade name "VESTANAT T1890", manufactured by Degussa AG, NCO content: 12.0% by weight). Methyl ethyl ketone was added as a solvent to this mixture to obtain a polyisocyanate composition No. 4 as a curing agent.

Example 1

A rubber composition A was obtained by kneading 100 parts by weight of a high-cis polybutadiene (trade name "BR-730", manufactured by JSR Corporation), 31 parts by weight of zinc diacrylate (trade name "Sanceler SR", manufactured by SANSHIN CHEMICAL INDUSTRY CO., LTD.), 10 parts by weight of zinc oxide (trade name "Ginrei R", manufactured by Toho Zinc Co., Ltd.), 0.4 parts by weight of PBDS (bis(pentabromophenyl)disulfide, manufactured by Kawaguchi Chemical Industry Co., Ltd.), 2 parts by weight of benzoic acid (manufactured by Emerald Kalama Chemical), 0.6 parts by weight of dicumyl peroxide (trade name "Percumyl D", manufactured by NOF Corporation), and an appropriate amount of barium sulfate (trade name "Barium Sulfate BD", manufactured by Sakai Chemical Industry Co., Ltd.). This rubber composition A was placed into a mold including upper and lower mold halves each having a hemispherical cavity, and heated at 155° C. for 18 minutes to obtain a core with a diameter of 39.7 mm. The amount of barium sulfate was adjusted such that a core having a predetermined weight was obtained.

A resin composition a was obtained by kneading 50 parts by weight of an ionomer resin (trade name "Himilan 1605", manufactured by Du Pont-MITSUI POLYCHEMICALS Co., Ltd.) and 50 parts by weight of another ionomer resin (trade name "Himilan AM7329", manufactured by Du Pont-MITSUI POLYCHEMICALS Co., Ltd.) with a twin-screw kneading extruder. The core was covered with this resin composition a by injection molding to form a mid layer with a thickness of 1.0 mm. The Shore D hardness of this mid layer was 64.

An adhesive composition (trade name "POLIN 750LE", manufactured by SHINTO PAINT CO., LTD.) including a two-component curing type epoxy resin as a base polymer was prepared. The base material liquid of this adhesive composition includes 30 parts by weight of a bisphenol A type epoxy resin and 70 parts by weight of a solvent. The curing agent liquid of this adhesive composition includes 40 parts by weight of a modified polyamide amine, 55 parts by weight of a solvent, and 5 parts by weight of titanium dioxide. The weight ratio of the base material liquid to the curing agent liquid is 1/1. This adhesive composition was applied to the surface of the mid layer with a spray gun, and kept at 23° C. for 12 hours to obtain an adhesive layer with a thickness of 10 µm.

A resin composition b was obtained by kneading 100 parts by weight of a thermoplastic polyurethane elastomer (trade name "Elastollan XNY82A", manufactured by BASF Japan Ltd.) and 4 parts by weight of titanium dioxide with a twin-screw kneading extruder. Half shells were obtained from this resin composition b by compression molding. The sphere consisting of the core, the mid layer, and the adhesive layer was covered with two of these half shells. These half shells and the sphere were placed into a final mold that includes upper and lower mold halves each having a hemispherical cavity and having a large number of pimples on its cavity face, and a cover with a thickness of 0.5 mm was obtained by compression molding. The Shore D hardness of the cover was 29. Dimples having a shape that is the inverted shape of the pimples were formed on the cover.

A paint composition P1 was obtained by mixing the polyol composition No. 1 (base material) and the polyisocyanate composition No. 1 (curing agent). The mixing ratio (A/B) between the base material and the curing agent of the paint composition P1 on the solid content basis was 100/32.7 (weight ratio), and the mole ratio (NCO/OH) in the paint composition P1 was 1.03/1.00. The surface of the main body consisting of the aforementioned core, the aforementioned mid layer, and the aforementioned cover was treated with sandblast, and the paint composition P1 was applied to the cover and dried at 40° C. for 24 hours to obtain an inner layer with a thickness of 10 µm. The indentation depth Di of the inner layer was 390 nm.

A paint composition P5 was obtained by mixing the polyol composition No. 2 (base material) and the polyisocyanate composition No. 2 (curing agent). The mixing ratio (A/B) between the base material and the curing agent of the paint composition P5 on the solid content basis was 100/14.2 (weight ratio), and the mole ratio (NCO/OH) in the paint composition P5 was 1.30/1.00. The paint composition P5 was applied to the surface of the inner layer and dried at 40° C. for 24 hours to obtain an outer layer with a thickness of 20 µm. The indentation depth Do of the outer layer was 1450 nm. The diameter of a golf ball including the outer layer was about 42.7 mm, and the weight thereof was about 45.6 g. The amount of compressive deformation of the golf ball was 2.9 mm.

Examples 2 to 16 and Comparative Examples 1 and 3 to 5

Golf balls of Examples 2 to 16 and Comparative Examples 1 and 3 to 5 were obtained in the same manner as Example 1, except the specifications of the paint layer was as shown in Tables 3 to 6 below. The paint compositions of the inner layer and the outer layer are shown in detail in Tables 1 and 2 below.

Comparative Example 2

A rubber composition B was obtained by kneading 100 parts by weight of a high-cis polybutadiene (trade name "BR-730", manufactured by JSR Corporation), 30.5 parts by weight of zinc diacrylate (trade name "Sanceler SR", manufactured by SANSHIN CHEMICAL INDUSTRY CO., LTD.), 10 parts by weight of zinc oxide (trade name "Ginrei R", manufactured by Toho Zinc Co., Ltd.), an appropriate amount of barium sulfate (trade name "Barium Sulfate BD", manufactured by Sakai Chemical Industry Co., Ltd.), 0.1 parts by weight of 2-thionaphthol (manufactured by Tokyo Chemical Industry Co., Ltd.), 0.3 parts by weight of bis (pentabromophenyl)disulfide (PBPS) (manufactured by Kawaguchi Chemical Industry Co., Ltd.), 0.7 parts by weight of dicumyl peroxide (trade name "Percumyl D", manufactured by NOF Corporation), and 2 parts by weight of benzoic acid (manufactured by Tokyo Chemical Industry Co., Ltd.). This rubber composition B was placed into a mold including upper and lower mold halves each having a hemispherical cavity, and heated at 150° C. for 19 minutes to obtain a core with a diameter of 39.7 mm. The amount of barium sulfate was adjusted such that a core having a predetermined weight was obtained.

A resin composition c was obtained by kneading 55 parts by weight of an ionomer resin (trade name "Himilan AM7329", manufactured by Du Pont-MITSUI POLYCHEMICALS Co., Ltd.), 45 parts by weight of another ionomer resin (trade name "Himilan 1555", manufactured by Du Pont-MITSUI POLYCHEMICALS Co., Ltd.), an appropriate amount of barium sulfate, and 3 parts by weight of titanium dioxide with a twin-screw kneading extruder. The core was covered with this resin composition c by injection molding to form a mid layer with a thickness of 1.0 mm.

A paint composition (trade name "POLIN 750LE", manufactured by SHINTO PAINT CO., LTD.) including a two-component curing type epoxy resin as a base polymer was prepared. The base material liquid of this paint composition includes 30 parts by weight of a bisphenol A type epoxy resin and 70 parts by weight of a solvent. The curing agent liquid of this paint composition includes 40 parts by weight of a modified polyamide amine, 55 parts by weight of a solvent, and 5 parts by weight of titanium dioxide. The weight ratio of the base material liquid to the curing agent liquid is 1/1. This paint composition was applied to the surface of the mid layer with a spray gun, and kept at 23° C. for 12 hours to obtain a reinforcing layer with a thickness of 10 μm.

A resin composition d was obtained by kneading 100 parts by weight of a thermoplastic polyurethane elastomer (trade name "Elastollan NY80A", manufactured by BASF Japan Ltd.), 4 parts by weight of titanium dioxide, and 0.04 parts by weight of ultramarine blue with a twin-screw kneading extruder. Half shells were obtained from this resin composition d by compression molding. The sphere consisting of the core, the mid layer, and the reinforcing layer was covered with two of these half shells. These half shells and the sphere were placed into a final mold that includes upper and lower mold halves each having a hemispherical cavity and having a large number of pimples on its cavity face, and a cover with a thickness of 0.5 mm was obtained by compression molding. Dimples having a shape that is the inverted shape of the pimples were formed on the cover.

The surface of the main body consisting of the aforementioned core, the aforementioned mid layer, and the aforementioned cover was treated with sandblast, and the aforementioned paint composition P1 was applied to the cover and dried at 40° C. for 24 hours to obtain an inner layer with a thickness of 10 μm. The indentation depth Di of the inner layer was 390 nm.

A paint composition P2 shown in Table 1 below was applied to the surface of the inner layer and dried at 40° C. for 24 hours to obtain an outer layer with a thickness of 10 μm. The indentation depth Do of the outer layer was 1500 nm. The diameter of a golf ball including the outer layer was about 42.7 mm, and the weight thereof was about 45.6 g. The amount of compressive deformation of the golf ball was 2.9 mm.

[Spin Rate (I#8)]

A middle iron (trade name "XXIO", manufactured by DUNLOP SPORTS CO. LTD., shaft hardness: R, loft angle: 24.0°) was attached to a swing machine manufactured by Golf Laboratories, Inc. The golf balls of Examples 1 to 16 and Comparative Examples 1 to 5 were hit under a condition of a head speed of 38 m/sec, and the spin rates (rpm) immediately after the hits were measured. The average value of data obtained by 10 measurements is shown in Tables 3 to 6 below.

[Feel at Impact]

Ten golf players (advanced players) hit the golf balls of Examples 1 to 16 and Comparative Examples 1 to 5 with sand wedges (trade name "CG15 Forged Wedge", manufactured by Roger Cleveland Golf Company, Inc., loft angle: 58°) and were asked about feel at impact. The evaluation was categorized as follows on the basis of the number of golf players who answered that the feeling was good ("it was good because of feeling as if the ball was put on the face of the sand wedge", "it was good because of feeling as if sufficient spin was given", "it was good because of feeling as if the ball stuck", etc.). The results are shown in Tables 3 to 6 below.

A: 8 players or more
B: 5 to 7 players
C: 3 to 4 players
D: 2 players or less

TABLE 1

Constitution of Paint Composition

| | Type | | | | |
|---|---|---|---|---|---|
| | P1 | P2 | P3 | P4 | P5 |
| Polyol composition | No. 1 | No. 1 | No. 1 | No. 2 | No. 2 |
| Polyisocyanate composition | No. 1 | No. 1 | No. 1 | No. 2 | No. 4 |
| Weight ratio (A/B) | 100/32.7 | 100/14.7 | 100/9.2 | 100/10.7 | 100/14.2 |
| Mole ratio (NCO/OH) | 1.03/1.0 | 0.46/1.0 | 0.38/1.0 | 1.2/1.0 | 1.3/1.0 |
| Indentation depth (nm) | 390 | 1500 | 2850 | 2850 | 1450 |

TABLE 2-1

Constitution of Paint Composition

| | Type | | | |
|---|---|---|---|---|
| | P6 | P7 | P8 | P9 |
| Polyol composition | No. 1 | No. 1 | No. 1 | No. 1 |
| Polyisocyanate composition | No. 1 | No. 1 | No. 1 | No. 3 |
| Weight ratio (A/B) | 100/38.2 | 100/8.2 | 100/16.0 | 100/34.4 |
| Mole ratio (NCO/OH) | 1.6/1.0 | 0.34/1.0 | 0.65/1.0 | 0.95/1.0 |
| Indentation depth (nm) | 220 | 3400 | 1250 | 70 |

TABLE 2-2

Constitution of Paint Composition

| | Type | |
|---|---|---|
| | P10 | P11 |
| Polyol composition | No. 1 | No. 1 |
| Polyisocyanate composition | No. 1 | No. 1 |
| Weight ratio (A/B) | 100/24.0 | 100/7.8 |
| Mole ratio (NCO/OH) | 0.99/1.0 | 0.32/1.0 |
| Indentation depth (nm) | 720 | 4400 |

TABLE 3

Evaluation Results

| | Ex. 1 | Ex. 2 | Ex. 3 | Ex. 4 | Ex. 5 |
|---|---|---|---|---|---|
| Inner layer | | | | | |
| First paint composition | P1 | P1 | P1 | P6 | P1 |

TABLE 3-continued

Evaluation Results

|  | Ex. 1 | Ex. 2 | Ex. 3 | Ex. 4 | Ex. 5 |
|---|---|---|---|---|---|
| Ti (μm) | 10 | 10 | 10 | 10 | 10 |
| Di (nm) | 390 | 390 | 390 | 220 | 390 |
| Outer layer |  |  |  |  |  |
| Second paint composition | P5 | P4 | P7 | P7 | P8 |
| To (μm) | 20 | 20 | 20 | 20 | 20 |
| Do (nm) | 1450 | 2850 | 3400 | 3400 | 1250 |
| To − Ti (μm) | 10 | 10 | 10 | 10 | 10 |
| Do − Di (nm) | 1110 | 2460 | 3010 | 3180 | 860 |
| (I#8) Spin rate (rpm) | 7550 | 7580 | 7610 | 7540 | 7530 |
| (SW) Feel at impact | A | A | A | A | C |

TABLE 4

Evaluation Results

|  | Ex. 6 | Ex. 7 | Ex. 8 | Ex. 9 | Ex. 10 |
|---|---|---|---|---|---|
| Inner layer |  |  |  |  |  |
| First paint composition | P2 | P9 | P10 | P9 | P1 |
| Ti (μm) | 10 | 10 | 10 | 10 | 10 |
| Di (nm) | 1500 | 70 | 720 | 70 | 390 |
| Outer layer |  |  |  |  |  |
| Second paint composition | P3 | P3 | P11 | P10 | P4 |
| To (μm) | 20 | 20 | 20 | 20 | 13 |
| Do (nm) | 2850 | 2850 | 4400 | 720 | 2850 |
| To − Ti (μm) | 10 | 10 | 10 | 10 | 3 |
| Do − Di (nm) | 1350 | 2780 | 3400 | 830 | 2460 |
| (I#8) Spin rate (rpm) | 7600 | 7520 | 7590 | 7510 | 7565 |
| (SW) Feel at impact | C | C | C | C | B |

TABLE 5

Evaluation Results

|  | Ex. 11 | Ex. 12 | Ex. 13 | Ex. 14 | Ex. 15 |
|---|---|---|---|---|---|
| Inner layer |  |  |  |  |  |
| First paint composition | P1 | P1 | P1 | P1 | P1 |
| Ti (μm) | 10 | 3 | 1 | 12 | 3 |
| Di (nm) | 390 | 390 | 390 | 390 | 390 |
| Outer layer |  |  |  |  |  |
| Second paint composition | P4 | P4 | P4 | P4 | P4 |
| To (μm) | 11 | 20 | 20 | 20 | 6 |
| Do (nm) | 2850 | 2850 | 2850 | 2850 | 2850 |
| To − Ti (μm) | 1 | 17 | 19 | 8 | 3 |
| Do − Di (nm) | 2460 | 2460 | 2460 | 2460 | 2460 |
| (I#8) Spin rate (rpm) | 7555 | 7570 | 7575 | 7560 | 7500 |
| (SW) Feel at impact | B | A | C | B | C |

TABLE 6

Evaluation Results

|  | Ex. 16 | Comp. Ex. 1 | Comp. Ex. 2 | Comp. Ex. 3 | Comp. Ex. 4 | Comp. Ex. 5 |
|---|---|---|---|---|---|---|
| Inner layer |  |  |  |  |  |  |
| First paint composition | P1 | P1 | P1 | P2 | P1 | P2 |
| Ti (μm) | 10 | 10 | 10 | 10 | 20 | 20 |
| Di (nm) | 390 | 390 | 390 | 1500 | 390 | 1500 |
| Outer layer |  |  |  |  |  |  |
| Second paint composition | P4 | P1 | P2 | P1 | P2 | P1 |
| To (μm) | 22 | 20 | 10 | 20 | 10 | 10 |
| Do (nm) | 2850 | 390 | 1500 | 390 | 1500 | 390 |
| To − Ti (μm) | 12 | 10 | 0 | 10 | −10 | −10 |
| Do − Di (nm) | 2460 | 0 | 1110 | −1110 | 1110 | −1110 |
| (I#8) Spin rate (rpm) | 7585 | 7450 | 7470 | 7460 | 7480 | 7455 |
| (SW) Feel at impact | C | D | D | D | D | D |

As shown in Tables 3 to 6, the golf ball of each Example has excellent controllability upon a shot with a middle iron and excellent feel at impact upon an approach shot. From the results of the evaluation, advantages of the present invention are clear.

The golf ball according to the present invention is suitable for, for example, playing golf on golf courses and practicing at driving ranges. The paint layer of the golf ball is applicable to a one-piece ball, a two-piece ball, a four-piece ball, a five-piece ball, a six-piece ball, a thread-wound ball, and the like in addition to the exemplified three-piece ball. The above descriptions are merely illustrative examples, and various modifications can be made without departing from the principles of the present invention.

What is claimed is:

1. A golf ball comprising a main body and a paint layer positioned outside the main body, wherein
   the paint layer includes an inner layer and an outer layer positioned outside the inner layer,
   when an indentation depth (nm) is measured on a cross-section along a plane passing through a central point of the golf ball when a force of 30 mgf is applied to the cross-section in a direction perpendicular to the cross-section, an indentation depth Di on a cross-section of the inner layer is smaller than an indentation depth Do on a cross-section of the outer layer, and
   a thickness To of the outer layer is larger than a thickness Ti of the inner layer.

2. The golf ball according to claim 1, wherein the indentation depth Do is not less than 1000 nm and not greater than 3500 nm.

3. The golf ball according to claim 1, wherein the indentation depth Di is not less than 100 nm and less than 1000 nm.

4. The golf ball according to claim 1, wherein the thickness To is not less than 8 μm and not greater than 20 μm.

5. The golf ball according to claim 1, wherein the thickness Ti is not less than 1 μm and not greater than 10 μm.

6. The golf ball according to claim 1, wherein a difference (To-Ti) between the thickness To and the thickness Ti is not less than 3 μm and not greater than 17 μm.

7. The golf ball according to claim 1, wherein a difference (Do-Di) between the indentation depth Do and the indentation depth Di is not less than 1000 nm and not greater than 3100 nm.

8. The golf ball according to claim 1, wherein
the outer layer is formed from a paint composition including: a base material including a polyrotaxane; and a curing agent including a polyisocyanate compound,
the polyrotaxane has cyclodextrins, a linear molecule threaded through ring structures of the cyclodextrins, and a blocking group which is located at each of both ends of the linear molecule and prevents detachment of the cyclodextrins, and
at least a part of hydroxyl groups of each cyclodextrin is modified with a caprolactone chain via an —O—C3H6—O— group.

9. The golf ball according to claim 8, wherein a mole ratio (NCO/OH) of an isocyanate group (NCO group) of the curing agent including the polyisocyanate compound to a hydroxyl group (OH group) of the base material including the polyrotaxane is not less than 1.0 and not greater than 2.0.

* * * * *